UNITED STATES PATENT OFFICE.

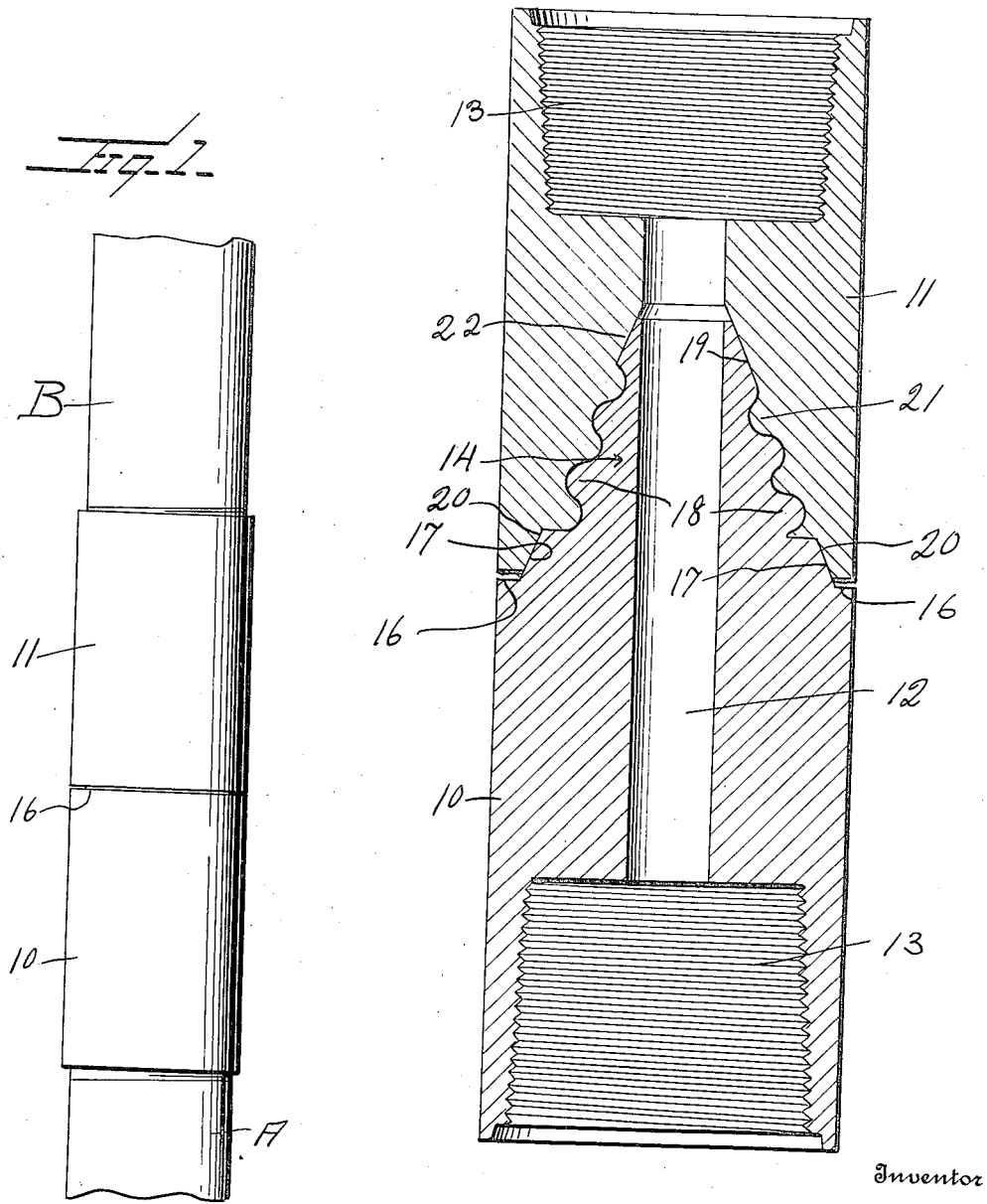

BENJAMIN F. RUNYAN, OF HOUSTON, TEXAS, ASSIGNOR OF FIFTY-ONE PER CENT. TO JAMES P. MARKHAM, JR., OF HOUSTON, TEXAS.

PIPE-COUPLING.

1,394,791. Specification of Letters Patent. Patented Oct. 25, 1921.

Application filed July 21, 1920. Serial No. 397,935.

*To all whom it may concern:*

Be it known that I, BENJAMIN F. RUNYAN, a citizen of the United States, residing at Houston, in the county of Harris and State of Texas, have invented certain new and useful Improvements in Pipe-Couplings, of which the following is a specification, reference being had to the accompanying drawings.

This invention relates to couplings whereby two pipes or rods may be connected to each other, and particularly to that type of coupling wherein one of the sections is formed with a socket and the other section is provided with screw-threads to engage the socket, the coupling being adapted for connecting tubular pump rods of oil wells, connecting pipe sections to each other, or indeed for connecting any two parts where it is desirable that the connection shall be firm and yet quickly detachable.

In the ordinary pipe coupling such as is used in deep oil wells, the bearing of one section of the pipe on the other is very largely on the threads of the coupling and the male and female members contact with each other against annular, flat shoulders. The result is that when the joint becomes worn there is liable to be lost motion between the sections and the strain coming on the threads requires that the threads should be relatively deep or there is a tendency for the threads to strip or chip off.

The general object of my invention is the provision of a novel form of coupling wherein the female member or socket is generally conoidal in form and the male member correspondingly conoidal, the confronting faces of the socket in the male member being formed with relatively large and quick acting threads and with two beveled seating faces having wedging engagement with each other as the two sections are screwed together.

A further object is to provide a coupling of this character wherein the relatively coarse and quick threads of the male and female members are transversely rounded or are of curved cross section so that the threads will not be formed with edges or corners which are liable to be chipped off.

A further object is to provide a construction of this character wherein the threads in the coupling merely serve to guide the joints or sections together and to hold from pulling apart, but wherein the vibration to which the joint is subjected is taken up by the beveled, annular seats whereby the wear on the threads will be reduced to a minimum and whereby the two sections of the coupling may be forced farther and farther into engagement with each other to take up wear.

Other objects will appear in the course of the following description.

My invention is illustrated in the accompanying drawings, wherein:—

Figure 1 is an elevation of my improved pipe coupling in use;

Fig. 2 is a longitudinal sectional view of the pipe coupling.

Referring to these drawings, and particularly to Fig. 2, 10 designates the male section of the coupling and 11 the female section. Each of these sections is shown as having a longitudinally extending, central bore 12 terminating in a relatively enlarged, interiorly screw-threaded bore 13. The exterior diameter of the two sections is the same, and the bores 13 are adapted to receive the ends of the pipe sections A and B which the coupling is intended to connect.

The male member 10 is formed at its entering end with a substantially conoidal portion 14. At the base of this portion there is formed a shoulder 16 extending inwardly from the periphery of the section, and inward of this shoulder there is formed the upwardly and inwardly beveled, annular seat 17. Beyond this shoulder the exterior face of this conoidal portion 14 is formed with a plurality of relatively large and coarse threads 18 of approximately $\frac{1}{2}''$ to $\frac{1}{4}''$ pitch, and the extremity of this portion 14 terminates in a beveled, annular face 19. The threads 18 are transversely rounded or semi-circular in form, and as before remarked, these threads are relatively wide.

The socket of the female member 11 at its outer end is formed with an inwardly and centrally beveled face 20 to fit against the beveled face 17 and inward of this beveled face 20 with a series of relatively large screw-threads 21 coacting with the screw-threads 18 and inward of this screw-threaded portion with an inwardly and centrally beveled seat 22 to fit against the beveled face 19.

Now the advantages of this construction are as follows: As before remarked, in other pipe couplings known to me, the bearing is very largely on the threads, while in my improved pipe coupling the bearing is on the seats 17 and 19 or 20 and 22, as the case may be, at the point of contact between these portions of the two sections of the coupling, thus relieving the threads of strain and consequent wear. These seats do not engage on surfaces perpendicular to the axis of the pipe, but at an angle to that axis, and the resulting advantage is that the joint when worn merely seats farther down on the bevel and there is no wabble or lost motion at the joint. Inasmuch as the threads are of curved cross section or surface, there will be no edges or sharp corners to chip off or strip off. The threads merely serve to guide the two parts of the joint together and to hold them from pulling apart, but the vibration to which the joint will be subjected is carried by the beveled seats. Thus the wear on the threads is reduced to a minimum and there will be less dropping and loosening of the joint. Furthermore, the two sections of the coupling may be interlocked with each other with only a very few turns. The new coupling, therefore, has the features of having beveled, instead of axially, perpendicular seating surfaces, and curve-crested threads instead of threads having a square edge. This device may be used for coupling together any two elements which need to be coupled, and I do not wish to be limited to its use as a pipe coupling or a tool coupling for deep wells.

I claim:—

1. A coupling for reciprocating implements comprising two sections, one of said sections being tubular and being formed with a substantially conoidal socket, said socket adjacent its outer end being formed with a centrally and longitudinally inclined, annular seat and then being formed with a plurality of relatively coarse screw-threads, the socket terminating at its inner end in an annular, beveled seat, extending to and intersecting the hollow bore of the tubular section the other section having a substantially conoidal prolongation adapted to be inserted in the socket, said prolongation at its base being formed with a longitudinally and axially inclined seat to confront the first named seat on the other section and longer than said last-named seat, and beyond this seat being formed with a plurality of relatively coarse threads engaging the screw-threads of the other section and at its extremity being formed with an annular, beveled seat to confront the second named seat on the first named section, said beveled seat extending to the extremity of the section.

2. A coupling for reciprocating implements comprising two sections, one of said sections being tubular and being formed with a substantially conoidal socket, said socket adjacent its outer end being formed with a centrally and longitudinally inclined, annular seat, and then being formed with a plurality of relatively coarse screw-threads, the socket terminating at its inner end in an annular, beveled seat, extending to and intersecting the bore of the tubular section, the other section having a substantially conoidal prolongation adapted to be inserted in the socket, said prolongation at its base being formed with a longitudinally and axially inclined seat to confront the first named seat on the other section and longer than the said first named seat, and beyond this seat being formed with a plurality of relatively coarse threads engaging the screw-threads of the other section and at its extremity being formed with an annular, beveled seat to confront the second named seat on the first named section and extending to the extremity of the second named section, said screw-threads being rounded in cross section.

In testimony whereof I hereunto affix my signature.

BENJAMIN F. RUNYAN.